Patented Nov. 1, 1938

2,135,459

UNITED STATES PATENT OFFICE 2,135,459

PREPARATION OF ORGANIC ACIDS FROM OLEFINES AND CARBON MONOXIDE

Donald John Loder, Wilmington, Del., assignor to E. I. du Pont de Nemours & Company, Wilmington, Del., a corporation of Delaware No Drawing. Application July 7, 1936, Serial No. 89,457

11 Claims. (Cl. 260—533)

This invention relates to the synthesis of organic compounds and particularly to the liquid phase preparation of higher aliphatic acids by the interaction of olefines, carbon monoxide, and water.

In the U. S. patent of Gilbert B. Carpenter Patent No. 1,924,766, a process is described for the preparation of aliphatic carboxylic acids of the higher order by the reaction in the vapor phase of steam, carbon monoxide, and an olefinic hydrocarbon, i. e., an aliphatic hydrocarbon containing a double bond,—for example, the olefines, ethylene, propylene, butylene, etc.,—the synthesis producing from these olefines propionic, butyric, and valeric acids respectively,—the diolefines likewise may be similarly treated to give e. g. from isoprene, trimethyl succinic acid, and from 1.4 penta diene symmetrical dimethyl glutaric acid.

An object of the present invention is to provide a process for the preparation of aliphatic carboxylic acids and corresponding ethers and/or esters from water, carbon monoxide, and olefinic hydrocarbons, such as those given above. A further object of the invention is to provide a process for the preparation of organic compounds by reacting an olefine, water and carbon monoxide with a compound containing boron and a halogen as the condensing agent, in the presence or absence of absorbent material such as pumice, silica gel, activated carbon, etc. Another object of the invention is to provide a process for the preparation of acids having the structural formula—

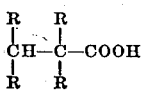

from water, carbon monoxide, and an olefinic hydrocarbon, the R indicating hydrogen or a substituted or unsubstituted similar or dissimilar alkyl or aralkyl grouping. Other objects and advantages will hereinafter appear.

In accord with the present invention aliphatic carboxylic acids can be prepared from water, carbon monoxide, and an olefinic hydrocarbon by reacting these constituents, in the presence of a condensing agent containing boron and a halogen. Aliphatic ethers and esters corresponding to the acid produced may likewise be present in the reaction products.

The boron halides such as boron trifluoride may be employed in an anhydrous or hydrous state but in either event due to the presence of water as a reactant it would be expected that the hydrated form of the halide is actually present during the reaction. Due to the exceedingly high activity of these condensing agents a solution containing them is capable of effecting the rapid condensation of olefines with carbon monoxide and water. Other compounds which contain boron and a halogen may be employed, such, for example, as aqueous solutions of dihydroxy fluoboric acid, borofluohydric acid, and, in general, the oxygenated acids obtained from mixtures of hydrogen fluoride and the boric acids. Aqueous solutions of boron fluoride, as well as the other condensing agents, may be used alone or as mixtures of any of the other condensing agents or they may be used in the presence of promoters, such as, powdered nickel, nickel oxides, mercuric oxide or other powdered metals or metal oxides which may be introduced to promote the activity of the condensing agent. Generally, however, I prefer to use aqueous boron fluoride alone for it is such a powerful condensing agent that promoters for further extending its condensing ability are not ordinarily necessary.

For condensing agent requirements, if it is desired to introduce into the reaction the aqueous type catalyst, the ratio of water to the boron fluoride may vary through wide limits but generally it has been found that the ratio of water to the boron fluoride may vary up to approximately 5 mols per mol of the boron fluoride, although a greater or smaller amount of water may be present. The optimum ratio appears to be 1 mol of the boron fluoride to 3 mols of water.

My preferred condensing agents may be used in various proportions which are governed by the type of olefine being treated. In the absence of promoters they may be used in proportions ranging from 0.25 to 4 mols calculated on the nonmetal halide present or higher per mol of the olefine or other compound reacted while in the presence of promoters much lower amounts may be employed, say, generally, from 1 to 5% and, in some instances, higher percentages may be required. The activity of the promoter determines in large measure the amount required, the particular alcohol or alcohols as well as the temperature and pressure conditions also being considered.

Raw materials suitable for use in the process are readily available from a number of sources. Thus, ethylene and various homologues thereof are found in the gases evolved in cracking petroleum and may be separated therefrom, for example by fractional liquefaction. It is preferable, for the sake of making a single pure product, that the hydrocarbon which it is desired to convert be employed in a relatively high degree of purity.

The carbon monoxide required for the synthesis may conveniently be derived from various commercial sources, such as, for example, water-gas, producer gas, carbide preparation, etc., by liquefaction or other methods, and should likewise for the best results be relatively pure.

The relative proportions of the reactants can be varied altho it has been found that very advantageous results can be obtained when the water (other than that which is optionally present for catalyst requirements) and carbon monoxide are in excess with respect to the olefinic hydrocarbon. Concentrations of the latter within the range of from 1½ to 10% by weight of the total reactants have been employed with good results.

The use of pressure in excess of atmospheric, say from 25 to 900 atmospheres, is preferred. The reaction proceeds over a wide range of temperatures, altho the optimum temperature varies with specific cases, depending inter alia upon the hydrocarbon being used. Generally, the desired reaction can be obtained up to 350° C. From the standpoint of practical operation the temperature should not be so low that the reaction rate is uneconomical nor so high as to result in undesirable by-products by decomposition and/or polymerization of raw materials. From this point of view the process has been found to operate satisfactorily at from 150 to 275° C.

The following examples will illustrate methods of practicing the invention, altho the invention is not limited to the examples.

*Example 1.*—A gaseous mixture may be prepared containing by volume 95% carbon monoxide and 5% ethylene, together with steam to give a steam:carbon monoxide and ethylene ratio of approximately 0.25. The resulting gaseous mixture is passed into the bottom of a vertically positioned conversion chamber designed for carrying out exothermic gaseous reactions and in which activated charcoal is disposed. A liquid condensing agent prepared by the reaction of 3 mols of liquid hydrofluoric acid with one mol of orthoboric acid, is introduced into the top of the converter and flows counter-current to the gaseous mixture. The temperature of the reaction is maintained at approximately 275° C. while the pressure is held at approximately 700 atmospheres. A good yield of propionic acid is obtained together with other aliphatic acids when operating under these conditions.

*Example 2.*—A gaseous mixture containing by volume 94% carbon monoxide, 5% propylene, and .125% dihydrofluoboric acid, together with steam, to give a steam:carbon monoxide and propylene ratio of approximately .25, is passed into a conversion chamber designed for carrying out gaseous exothermic reactions and in which activated charcoal has been disposed. At a temperature of approximately 325° C. and a pressure of 700 atmospheres, a good yield of isobutyric acid is obtained.

*Example 3.*—85.8 parts by weight of a water-boron fluoride addition compound (containing one mol of water per mol of boron fluoride) and 80 parts by weight of water were charged into a silver lined shaker tube. The pressure was raised to 40 atmospheres with ethylene and then 400 atmospheres of carbon monoxide was superimposed thereon. The temperature was raised to approximately 168° C. in 49 minutes and then held by means of cooling at a temperature of 168° C. to 177° C. for 41 minutes under a total pressure of from 800 to 900 atmospheres of carbon monoxide. During this period a pressure drop of 200 atmospheres occurred. The tube was cooled and discharged and the crude products upon distillation gave 19.8 parts by weight of a crude propionic acid-boron fluoride addition compound having a boiling point ranging between 150 and 160° C., at 1 atmosphere.

*Example 4.*—208 parts by weight of a water-boron fluoride addition compound containing 2 mols of water per mol of boron fluoride was charged into a silver lined shaker tube. A pressure of 400 pounds of ethylene was placed on the tube and the temperature raised to 120° C., during a period of 43 minutes and then held at a temperature between 120 and 126° C. for 73 minutes. The olefine pressure was maintained throughout the reaction period at 800 pounds per square inch. A pressure drop of 2000 pounds occurred. A carbon monoxide pressure of 400 atmospheres was then superimposed on the olefine pressure and the temperature raised to 160° C., during 52 minutes and held at a temperature of 160 to 175° C. for 57 minutes. A pressure drop of 470 atmospheres occurred. The shaker tube was cooled, the contents discharged, and the product upon distillation gave 19.1 parts by weight of a propionic acid-boron fluoride addition compound together with some ethyl propionate and ethanol.

*Example 5.*—Into a silver lined pressure shaker tube 2 mols of a water-boron fluoride addition compound containing one mol of water per mol of boron fluoride was charged and ethylene added at cylinder pressure. The temperature was raised to 120 to 150° C., and the reaction continued until one mol of ethylene had been absorbed. A carbon monoxide pressure of 600 to 900 atmospheres was then superimposed on the olefine pressure and the reaction mixture heated to 175 to 180° C. for a period of approximately 30 minutes. The shaker tube was cooled and discharged and the reaction mixture heated whereupon boron fluoride, equivalent to approximately one-half a mol, was driven off. Steam was then injected into the mixture and an aqueous propionic acid condensate was obtained having approximately a 70% strength of the acid. A crude residue remained containing a water-boron fluoride addition compound having from 2.3 to 2.5 mols of water per mol of boron trifluoride. The one-half a mol of boron trifluoride liberated on the first heating of the crude product is combined with the residue after the removal of the aqueous propionic acid. This boron fluoride water addition compound may again be recycled with the ethylene for the preparation of subsequent batches of propionic acid.

The apparatus, which may be employed for conducting these reactions, may be of any conventional type and preferably one in which the temperature of exothermic reactions can be readily controlled at the desired value. Owing to the corrosive action of the acids produced, the interior of the converter and conduits leading therefrom should preferably be protected. This may be accomplished by coating the inner surfaces of the apparatus with chromium or silver or using for the construction of this equipment acid-resisting alloys of, for example, molybdenum, cobalt, tungsten, chromium, copper, manganese, or nickel.

Various changes may be made in the methods hereinbefore described without departing from the invention or sacrificing the many advantages thereof.

I claim:

1. A process for the preparation of aliphatic carboxylic acids from a hydrating agent, carbon monoxide, and lower molecular weight olefinic hydrocarbon, which includes the step of effecting the reaction in the presence of a condensing agent prepared by adding as the condensing agent not appreciably more than 5 mols of water per mol of a boron fluoride.

2. A process of preparing aliphatic carboxylic acids which comprises passing a gaseous mixture containing a lower molecular weight olefine, and carbon monoxide into a liquid phase condensing agent containing not appreciably more than 5 mols of water per mol of boron trifluoride.

3. In a process for the preparation of aliphatic carboxylic acids from lower molecular weight olefines, carbon monoxide and water the steps which comprise contacting the olefine with a condensing agent containing water and boron trifluoride and subsequently condensing the resulting product with carbon monoxide.

4. In a process for the preparation of aliphatic carboxylic acids from lower molecular weight olefines, carbon monoxide and water the steps which comprise condensing a water-boron fluoride condensing agent with the olefine under a pressure ranging between 25 and 900 atmospheres and at a temperature ranging between 150 and 275° C., and subsequently condensing the resulting product with carbon monoxide under a pressure of from 25 to 900 atmospheres and a temperature between 150 and 275° C.

5. In a process for the preparation of propionic acid from ethylene, carbon monoxide and water the steps which comprise condensing ethylene with a boron trifluoride-water condensing agent at a pressure between 25 to 900 atmospheres and a temperature between 150 to 275° C., and subsequently condensing the resulting product with carbon monoxide at a temperature between 150 and 275° C., and a pressure between 25 and 900 atmospheres.

6. In a process for the preparation of aliphatic carboxylic acids from a lower molecular weight olefine, carbon monoxide and water the steps which comprise absorbing the olefine in a water-boron fluoride condensing agent, condensing the resulting product with carbon monoxide, heating the condensation product to drive off the free boron trifluoride present and subsequently steam distilling the residue to give an aqueous solution of an aliphatic carboxylic acid.

7. In a process for the preparation of aliphatic carboxylic acids from a lower molecular weight olefine, carbon monoxide and water the steps which comprise absorbing the olefine in a water-boron fluoride condensing agent, condensing the resulting product with carbon monoxide, heating the condensation product to drive off the free boron fluoride present and subsequently distilling the resulting product in the presence of sufficient water to maintain the water to boron fluoride ratio above 2.3 to 1, to give an aqueous solution of the aliphatic carboxylyic acids, the boron trifluoride liberated during the heating stage being combined with the residue remaining after the removal of the aliphatic carboxylic acids and the combined product being recycled.

8. In a process for the preparation of propionic acid from ethylene, carbon monoxide and water the steps which comprise condensing ethylene with a water-boron trifluoride addition compound containing one mol of water per mol of boron trifluoride, condensing the resulting product with carbon monoxide, heating the condensation product to drive off the free boron trifluoride present, distilling the residue to give an aqueous, propionic acid condensate, the boron trifluoride recovered in the heating stage being absorbed in the residue remaining after the removal of the aqueous propionic acid to give a boron trifluoride-water addition compound which is recycled.

9. A process for the preparation of oxygenated organic compounds which comprises passing a gaseous mixture containing ethylene and carbon monoxide into a liquid condensing agent containing 1 mol of boron fluoride to from 1 to 3 mols of water.

10. A process for the preparation of oxygenated organic compounds which comprises passing a gaseous mixture containing propylene and carbon monoxide into a liquid condensing agent containing 1 mol of boron fluoride to from 1 to 3 mols of water.

11. A process for the preparation of oxygenated organic compounds which comprises passing a gaseous mixture containing butylene and carbon monoxide into a liquid condensing agent containing 1 mol of boron fluoride to from 1 to 3 mols of water.

DONALD JOHN LODER.